United States Patent [19]
Haverkamp

[11] 3,899,243
[45] Aug. 12, 1975

[54] ARRANGEMENT FOR VIEWING THE INTERIOR OF A PRESSURE VESSEL

[75] Inventor: Wilhelm Haverkamp, Essen, Germany

[73] Assignee: Heinrich Koppers Gesellschaft mit beschrankter Haftung, Essen, Germany

[22] Filed: Dec. 19, 1973

[21] Appl. No.: 426,361

[30] Foreign Application Priority Data
Dec. 20, 1972 Germany.............................. 2262351

[52] U.S. Cl.................................. 350/319; 73/330
[51] Int. Cl.² ....................................... G02B 27/00
[58] Field of Search........ 350/319, 63; 73/330, 332, 73/334

[56] References Cited
UNITED STATES PATENTS

| | | |
|---|---|---|
| 3,321,265 | 5/1967 | Clave et al............................ 350/63 |
| 3,517,554 | 6/1970 | Smith............................. 350/319 UX |
| 3,788,730 | 1/1974 | Greenleaf....................... 350/319 X |

Primary Examiner—Ronald L. Wibert
Assistant Examiner—Matthew W. Koren
Attorney, Agent, or Firm—Michael S. Striker

[57] ABSTRACT

A housing has an interior provided with two axially spaced and aligned openings, and is connectable in sealing relationship with a wall of the pressure vessel, so that one of the openings is in registry with a viewing port provided in this wall. A spherical, cylindrical or conical body having a bore is sealingly accommodated in the interior of the housing and can be turned to and from a position in which its bore registers with the openings and, hence, with the port. Sight glasses, lenses or the like are sealingly mounted in the bore and permit viewing of the interior of the pressure vessel when the body is in the position in which the bore registers with the openings.

10 Claims, 5 Drawing Figures

ARRANGEMENT FOR VIEWING THE INTERIOR OF A PRESSURE VESSEL

BACKGROUND OF THE INVENTION

The present invention relates generally to a viewing arrangement, and in particular to an arrangement for viewing the interior of a pressure vessel.

It is necessary in many instances to view the interior of a vessel that is under pressure. This occurs, for instance, where finely divided solid combustible material is being oxidized in the presence of oxygen-containing gases and possibly also hydrogen. Under these circumstances it is important that the oxidation process, particularly the removal of the fluid or solid slag, be capable of being observed.

If the oxidation is carried out under substantial pressure, for instance at 30 or more atmospheres, then whatever equipment is used for viewing the interior of the pressure vessel through the wall thereof, is of course exposed not only to the high temperatures which prevail in the interior of the vessel, but also to the substantial pressure therein. This means that the viewing arrangement must be so constructed that it assures a reliable seal of the interior of the pressure vessel with respect to the ambient atmosphere. For various reasons, the existing prior-art arrangements do not satisfy all requirements made of them, particularly because they are constantly subjected to the high temperature and pressure in the interior of the vessel being observed, and which as a result suffer from various drawbacks.

SUMMARY OF THE INVENTION

Accordingly, it is a general object of the present invention to provide an improved arrangement for viewing the interior of a pressure vessel, which arrangement is not possessed of the disadvantages of the prior art.

More particularly, it is an object of the invention to provide such an improved arrangement which does not require that its optical components be permanently or for prolonged periods of time exposed to the pressure and temperature prevailing in the interior of the vessel which is to be inspected.

Another object of the invention is to provide such an arrangement which provides for a reliable sealing of the interior of the pressure vessel with respect to the ambient atmosphere.

In keeping with the above objects, and with others which will become apparent hereafter, one feature of the invention resides in an arrangement for viewing the interior of a pressure vessel which has a wall provided with a viewing port. According to the invention, the arrangement comprises a housing having an interior provided with two axial spaced and aligned openings, and connecting means for sealingly connecting the housing to the wall of the pressure vessel, so that one of the openings registers with the viewing port of the pressure vessel. A body of revolution is provided, having a bore and being sealingly accommodated in the interior of the housing for turning movement to and from a position in which its bore registers with the openings. Optical means is sealingly mounted in the bore for permitting viewing of the interior of the pressure vessel when the aforementioned body is in the position thereof.

The body may be substantially spherical, it may be cylindrical or it may be conical or frustoconical.

The construction according to the present invention makes it possible, by turning the body to the position in which its bore registers with the openings of the housing and hence with the viewing port in the wall of the pressure vessel, to observe the interior of the pressure vessel if and when this is required. On the other hand, however, when observation is not needed, the body can be turned away from the aforementioned position so that its optical components are not exposed to the temperature and pressure prevailing in the vessel. This is important for self-evident reasons, including the fact that the optical component or components are of course exposed to dust or other matter that may be present in the interior of the vessel and that can —if the optical components are permanently or over a prolonged period of time exposed to the interior of the vessel— so score the components that they will no longer permit appropriate viewing and will have to be replaced. This difficulty is avoided with the construction according to the present invention. On the other hand, it reliably seals the interior of the pressure vessel with respect to ambient atmosphere, so that in no position of the body of revolution any danger exists that a leak might develop to the ambient atmosphere.

A further important advantage of the construction according to the present invention is the fact that the body of revolution can be turned so that the bore will be swiveled end-to-end. In other words, when the optical component which during normal observation faces the interior of the pressure vessel is not required for such observation, the body of revolution can be turned so that this same component now faces the opposite opening through which an observer will view the interior of the vessel, and is thus accessible for cleaning, even during the actual operation of the installation. Moreover, if the optical means involves two or more optical components which are spaced from one another axially of the bore, then respective ones of these optical components can be removed and replaced if damaged, even during the actual operation of the pressure vessel without having to fear the development of leaks.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
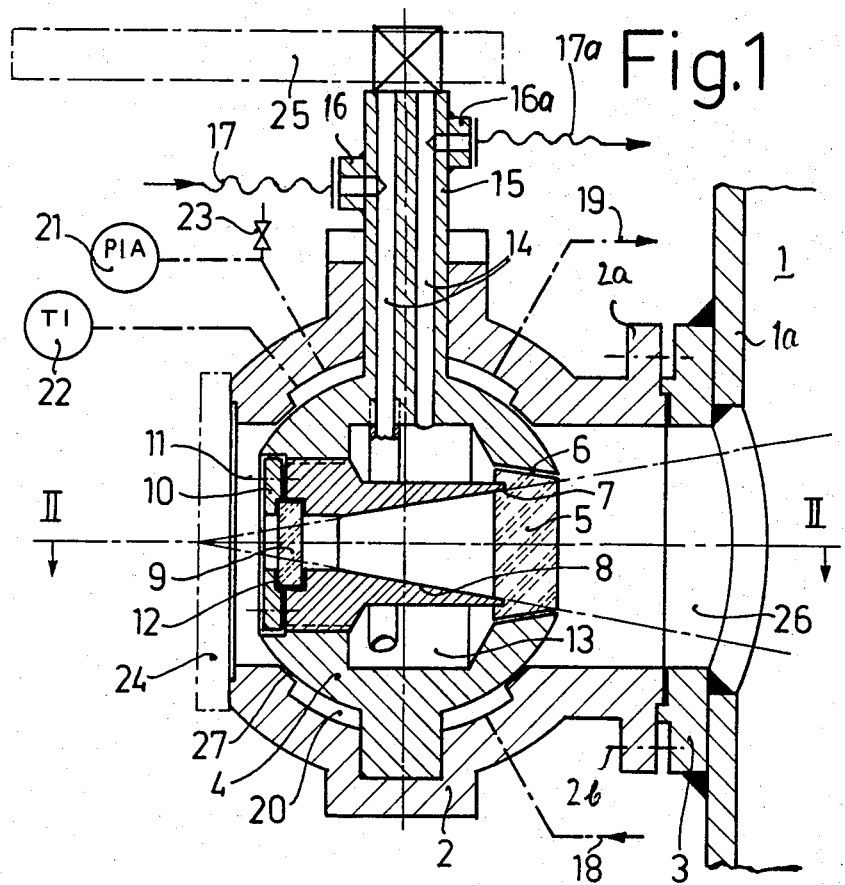
FIG. 1 is a section through an embodiment of the invention, the embodiment being shown in viewing position, and a portion of a wall of a pressure vessel being illustrated.

Referring now to the drawing in detail, which shows in FIG. 1 only a single exemplary embodiment which is not to be considered exhaustive or limiting in any sense, it will be seen that reference numeral 1a designates a portion of a wall of a pressure vessel, the interior of which is identified with reference numeral 1. This wall 1a is formed with a viewing port 26 through which the interior of the pressure vessel is to be observed. The pressure vessel may be a vessel wherein oxidation of coal dust is carried out, but of course it could be any other type of pressure vessel the interior of which is required to be observed. Reference numeral 2 identifies a housing having a flange 2a that is sealingly connected, as for instance by the diagrammatically illustrated screws or bolts 2b, with a flange 3 which is in turn welded to the wall 1a of the pressure vessel. The housing 2 has two axially spaced openings both of which communicate with its interior and which are in axial alignment with one another. One of these openings, namely the one which is the right-hand one in FIGS. 1 and 2, registers with the viewing port 26.

Sealingly mounted in the interior of the housing 2 is a body of revolution 4, here illustrated as a substantially spherical body. The outer circumference of the body 4 forms in the illustrated embodiment a clearance 20 with the inner circumferential surface bounding the interior of the housing 2, as shown in FIG. 1. Sealing elements 27 are provided which seal the clearance 20 with respect to the port 26 and thus the interior of the vessel, by being in engagement with both the housing 2 and the body 4. The sealing elements may consist of suitable metallic or plastic (e.g. Teflon) material.

The body 4 in turn is provided with a bore having two opposite ends, the right-hand facing end and the left-hand facing end in FIG. 1. Accommodated in one of these ends, the one that faces to the right in FIG. 1, is an optical sight glass 5 which has a conically tapering outer circumference and is seated into a correspondingly configured opening at the right-hand facing end of the bore, with a seal 6 interposed between them. The sight glass 5 is held in place and pressed into this opening and into sealing engagement with the seal 6, by the presence of a tubular member 11 the front end of which presses against the glass 5 and the rear end of which (the left-hand end in FIG. 1) is provided with an outer thread meshing with an inner thread in the wall bounding the left-hand end of the bore in FIG. 1. In the illustrated embodiment the inwardly facing side of the sight glass 5 is provided with an annular groove in which a seal 7 (e.g. Teflon) is located and into which the right-hand end of the member 8 extends, in engagement with the seal 7. Since the interior passage of the member 8 is conically convergent towards the left-hand side in FIG. 1, and since an additional sight glass 9 of smaller diameter than the sight glass 5 is lodged in a recess formed in the left-hand end of the member 8 and held in place by a flange 10 and two seals 12 via screws or bolts 11, additional protection against leakage and against the possibility of danger to an observer is provided.

Within the body 4 and surrounding the exterior of the member 8 there is provided a further clearance 13. The interior of the member 8 is sealed from the clearance 13, as will be clear. Cooling means are provided for cooling the body 4 by admitting cooling fluid, for instance water, into the clearance 13. For this purpose a shaft or extension portion 15 of the body 4 is formed with bores 14 one of which communicates with an inlet nipple 16 which in turn is connected with a supply hose 17 for the cooling fluid, whereas the other bore 14 communicates with an outlet nipple 16a which in turn is connected with an outlet hose 17a for the spent cooling fluid.

In addition, and this is particularly advantageous if the temperatures in the interior 1 of the pressure vessel are expected to be high, and consequently the housing 2 is expected to be subjected to high temperatures, a further cooling system can be provided which permits the circulation of cooling fluid through the gap 20. For this purpose there is provided a diagrammatically illustrated cooling fluid inlet conduit 18 and a similarly diagrammatically illustrated cooling fluid outlet conduit 19 both of which communicate with the clearance 20. In addition, a pressure indicator and alarm 21 and a temperature indicator 22 communicate with the clearance 20 to provide an indication of the temperature which obtains therein, and also of the pressure. In the event that the seals 27 should fail, a pressure change in the clearance 20 would result in a detection by the arrangement 21 and in the generation of an alarm signal which may be optical and/or acoustical. A valve 23 is provided to permit pressure relief from the clearance 20 if and when desired. A manual handle or lever 25 may be provided to be connected with the shaft 15 exteriorly of the housing 2, to permit turning of the shaft 15 and therefore of the body 4 to and from a position in which the longitudinal axis of the bore in the body 4 (i.e. the center line passing through both of the sight glasses 5 and 9) coincides with the axis of the port 26. This can be carried out manually, or the arm 25 can be turned by means of an electromotor or any other suitable arrangement. In fact, arm 25 could be omitted and an electromotor or other power drive could be connected directly with the upper end of the shaft 15, or indirectly with the shaft 15 in any suitable manner.

Figure 2:
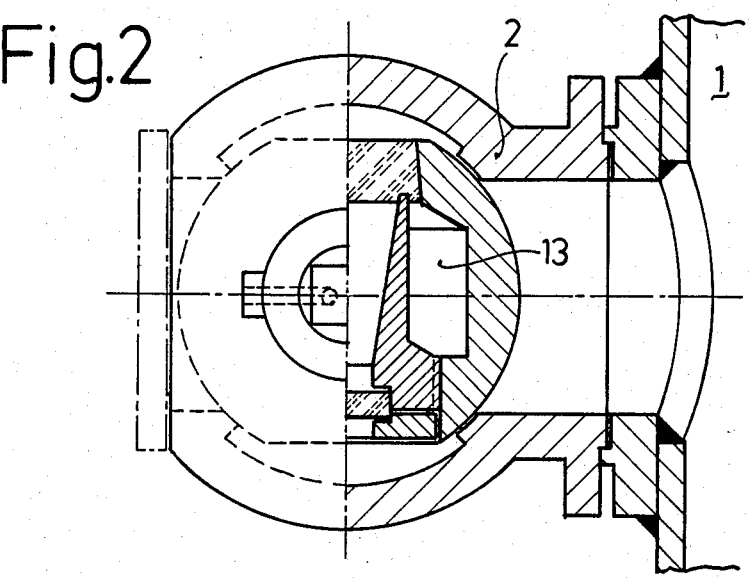
FIG. 2 is a fragmentary section on line II—II of FIG. 1, showing the arrangement in a position other than the viewing position.

FIG. 2 shows the arrangement in the position in which the body 4 has been turned to such an extent that the sight glass 5 is out of registry with the port 26 and thus protected against the temperature and pressure prevailing in the interior 1 of the pressure vessel. During the times during which the arrangement is not used for observing the interior of the pressure vessel, a flange or cover 24 may be provided which closes off the outer one of the openings in the housing 2, that is the opening through which an operator observes when the arrangement is in use, in order to provide further protection in the event of failure of the arrangement and leakage. The cover 24 can be threaded onto the housing 2 by means of cooperating screw threads on the cover and the housing, or it can be secured in place in other ways, for instance by means of bolts or the like.

It is, of course, possible to provide cooling only in the clearance 13 or only in the clearance 20, although to provide cooling in both clearances is generally preferable. It is also advantageous if the cooling is carried out constantly, that is even at such times at which the arrangement is not in use for viewing the interior of the vessel.

It is clear that the body 4 can be turned to such an extent that the sight glass 5 will be exposed at the left-hand end of the bore in the housing 2, so that the sight glass 5 can be cleaned even while the vessel having the interior 1 is in operation. Moreover, at least the sight glass 9 can be removed and replaced while the vessel is in operation, since the seal between the sight glass 5 and the body 4 will continue to be maintained by the pressure of the member 8. In some circumstances it may be desired or possibly even necessary —at least at times— to carry out the observation of the interior of the pressure vessel from a remote location. For this purpose the sight glass 9 can be removed and replaced —even while the vessel is in operation— with a television camera which is well enough known not to require detailed discussion.

Figure 5:
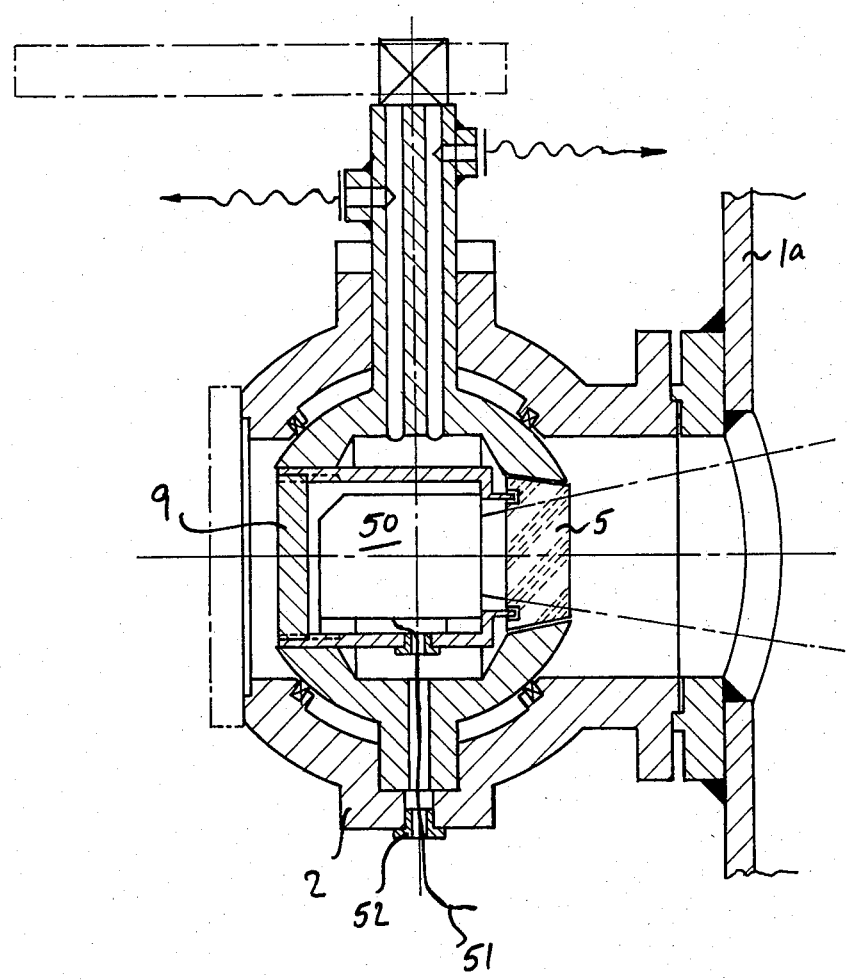
FIG. 5 is a view similar to FIG. 1, showing yet a further embodiment of the invention.

This modification is shown in FIG. 5, an embodiment which in all other respects resembles that of FIG. 1. The television camera 50 is here shown to be installed intermediate the sight glasses 5 and 9, although the latter could be omitted. Power and control cables 51 (one shown) for the camera 50 are brought out of the arrangement through a bore 52 extending along the turning axis of body 4 to avoid damage to the cables during turning of the body.

Figure 3:
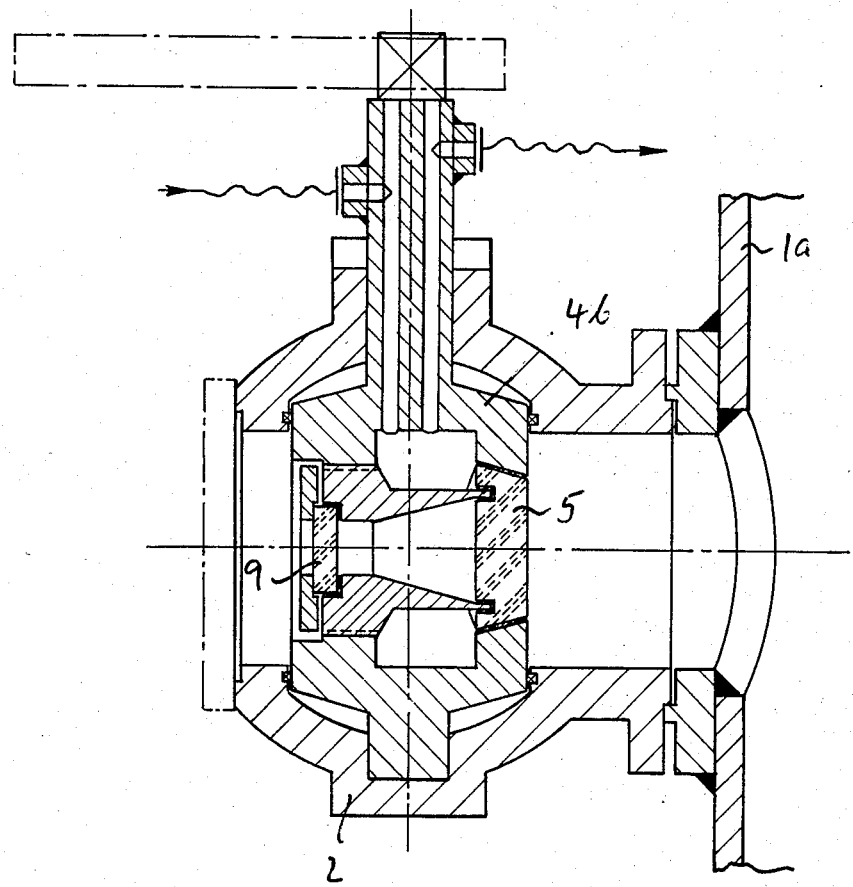
FIG. 3 is a view similar to FIG. 1, but showing another embodiment.

The embodiment of FIG. 3 corresponds in all particulars to that of FIG. 1, except that the body of revolution 4a is here of cylindrical configuration.

Figure 4:
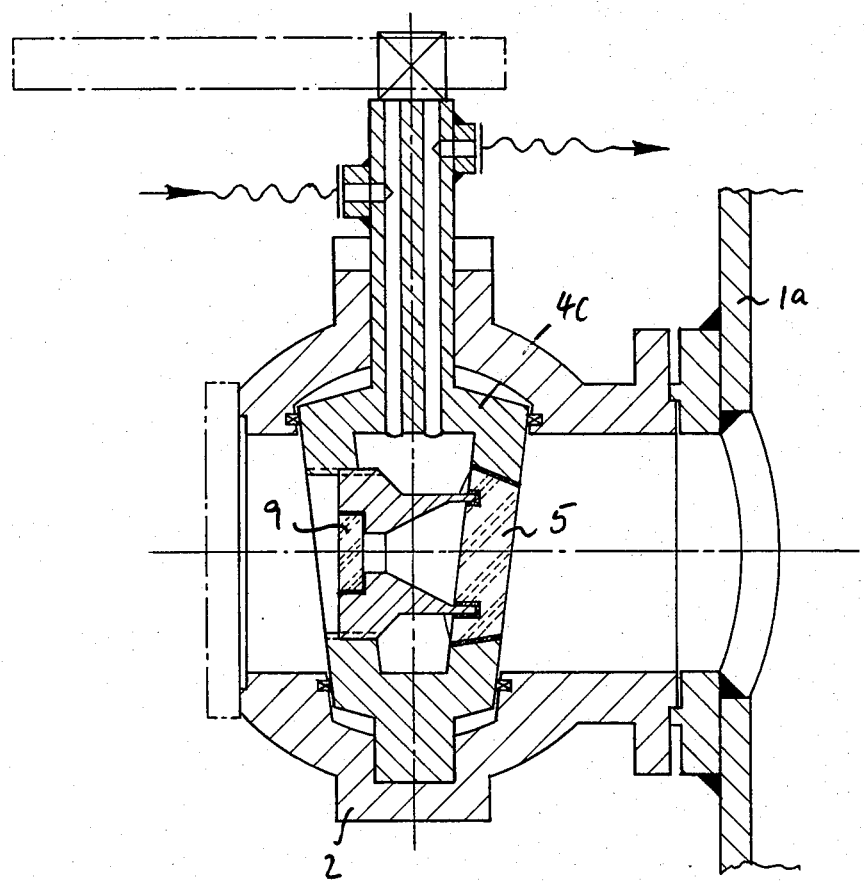
FIG. 4 is a view similar to FIG. 3, showing still another embodiment.

The embodiment of FIG. 4 is also analogous to that of FIG. 1, but uses a substantially conical body of revolution 4b. Since FIGS. 3–5 are closely related to the embodiment of FIG. 1 and are self-explanatory, they do not require more detailed descriptions.

It will be understood that each of the elements desired above, or two or more together, may also find a useful application in other types of constructions differing from the types described above.

While the invention has been illustrated and described as embodied in an arrangement for viewing the interior of a pressure vessel, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. An arrangement for viewing the interior of a pressure vessel which has a wall provided with a viewing port, comprising a housing having an interior provided with two axially spaced and aligned openings; connecting means for sealingly connecting said housing to said wall so that one of said openings registers with said viewing port; a body of revolution having a bore provided with two axially spaced open ends and being sealingly accommodated in said interior of said housing for turning to and from a position in which said bore registers with said openings; optical means sealingly mounted in said bore for permitting viewing of the interior of said pressure vessel when said body is in said position thereof, said optical means comprising a first optical element sealingly mounted in said bore in the region of one of said open ends, and a second optical element sealingly accommodated in said bore in the region of the other of said open ends; and retaining means retaining said second optical element in said bore.

2. An arrangement as defined in claim 1, wherein said body is of substantially spherical configuration.

3. An arrangement as defined in claim 1, wherein said body is of cylindrical configuration.

4. An arrangement as defined in claim 1, wherein said body is of substantially conical configuration.

5. An arrangement as defined in claim 1, wherein said body has an interior and an exterior surface; and further comprising cooling means for cooling at least one of said surfaces.

6. An arrangement as defined in claim 1; and further comprising means exteriorly of said housing and operative for effecting turning of said body to and from said position thereof.

7. An arrangement as defined in claim 1, wherein said retaining means are releasable retaining means which releasably retain said second optical element in said bore.

8. An arrangement for viewing the interior of a pressure vessel which has a wall provided with a viewing port, comprising a housing having an interior provided with two axially spaced and aligned openings; connecting means for sealingly connecting said housing to said wall so that one of said openings registers with said viewing port; a body of revolution having a bore and being sealingly accommodated in said interior of said housing for turning to and from a position in which said bore registers with said openings, said body having an outer surface which defines with an inner surface of said housing a gap; cooling means for admitting cooling fluid into said gap; and optical means sealingly mounted in said bore for permitting viewing of the interior of said pressure vessel when said body is in said position thereof.

9. An arrangement as defined in claim 8; and further comprising means for measuring and indicating the temperature and pressure prevailing in said gap.

10. An arrangement for viewing the interior of a pressure vessel which has a wall provided with a viewing port, comprising a housing having an interior provided with two axially spaced and aligned openings; connecting means for sealingly connecting said housing to said wall so that one of said openings registers with said viewing port; a hollow body of revolution having a bore and being sealingly accommodated in said interior of said housing for turning to and from a portion in which said bore registers with said openings; a substantially tubular element extending through said body, at least in part defining said bore and defining with the hollow interior of said body a clearance; cooling means for admitting a cooling fluid into said clearance; and optical means sealingly mounted in said bore for permitting viewing of the interior of said pressure vessel when said body is in said position thereof.

* * * * *